Patented Apr. 28, 1953

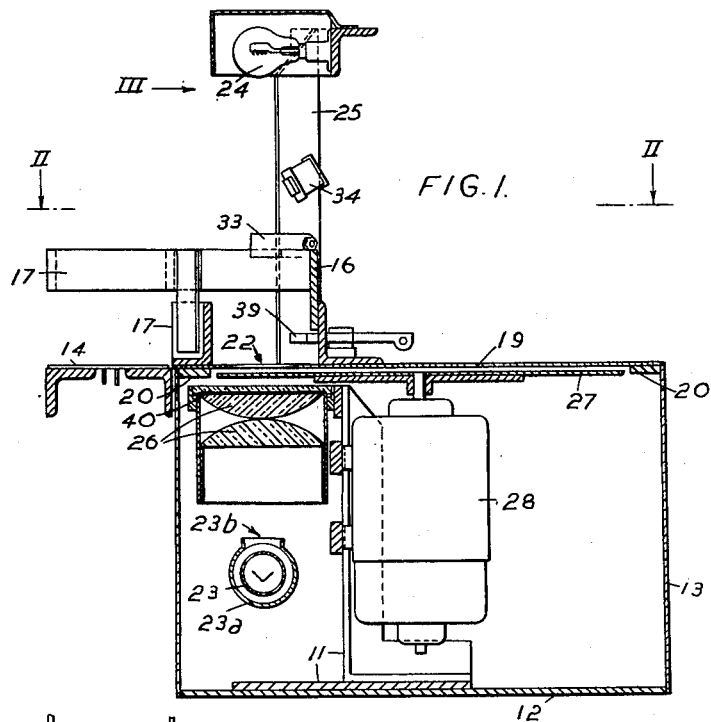
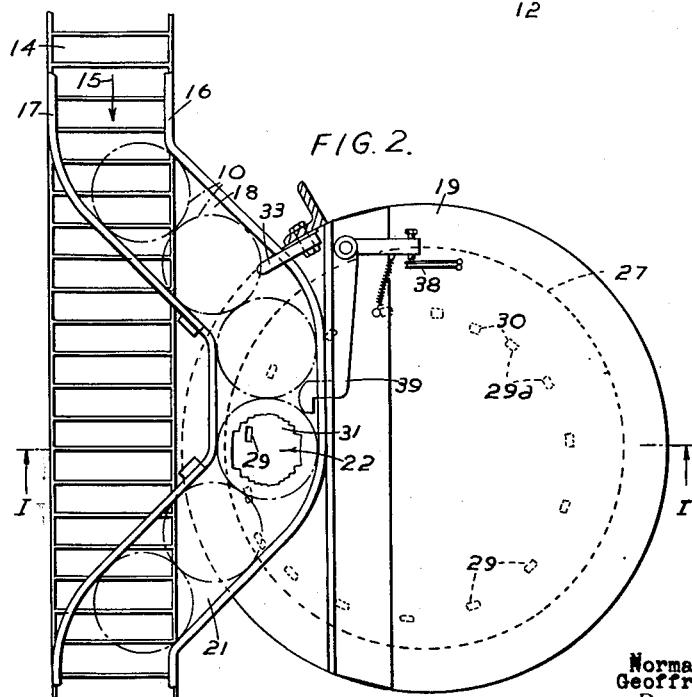

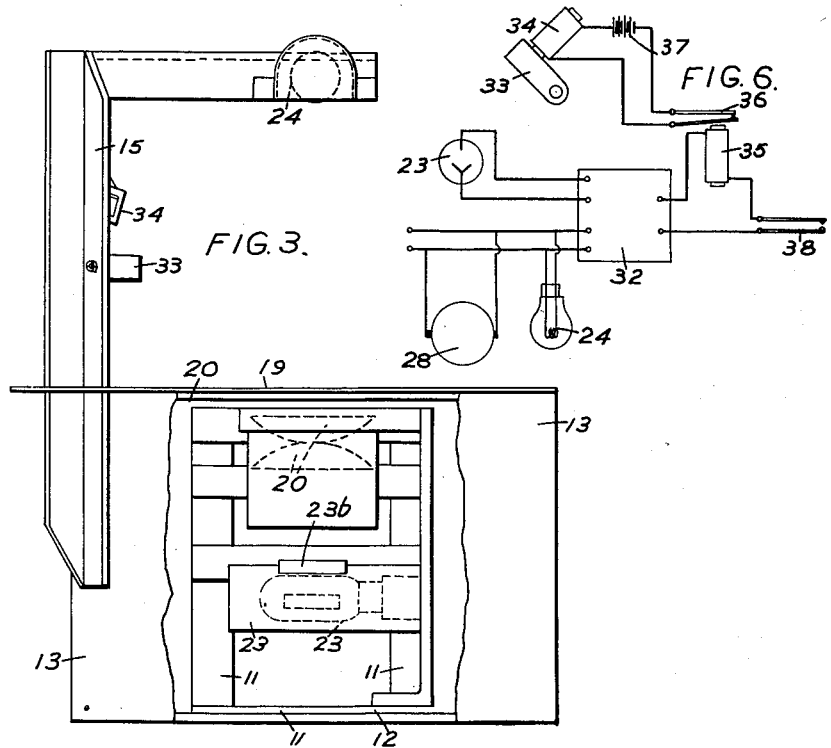
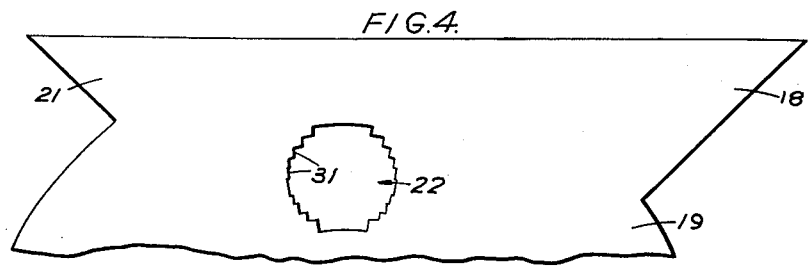
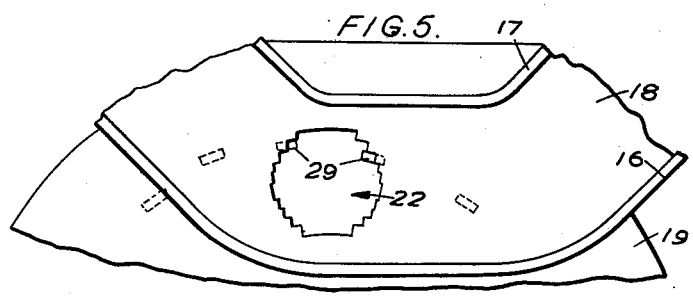

2,636,602

UNITED STATES PATENT OFFICE 2,636,602

APPARATUS FOR DETECTING THE PRESENCE OF FOREIGN BODIES ON THE BOTTOMS OF TRANSPARENT VESSELS

Norman Parker Stoate, Hampstead Garden, London, and Geoffrey Ernest Shepheard, Wembley, England, assignors to U. D. Engineering Company Limited, London, England, a British company Application June 17, 1948, Serial No. 33,566
In Great Britain June 18, 1947

8 Claims. (Cl. 209—111)

This invention relates to apparatus for detecting the presence of foreign bodies on the bottoms of transparent vessels, for instance, for detecting foreign bodies in milk bottles.

It is an object of the invention to provide an improved scanning mechanism for exploring an illuminated scanning field for a transparent vessel such as a milk bottle, and adapted to produce an electrical signal or indication when there is a foreign body on the bottom of the vessel in the scanning position.

According to the invention, apparatus for detecting the presence of foreign bodies on the bottoms of transparent vessels comprises in combination a support for a vessel, said support having an opening formed therein whose area is substantially equal to the internal area of the bottom of a vessel, a photo-electric device disposed beneath the support, a source of light disposed to direct its light through the bottom of a vessel disposed over said opening, a scanning member movable between the support and photo-electric device and including a series of scanning apertures of substantially equal area so displaced relatively one to the other that each scans a different area of said opening and they collectively scan the entire area of said opening, the spacing between said apertures, considered in the direction of movement of the scanning member, being such that as one becomes obturated by the support a complementary area of the next is exposed thereby so that at any instant a scanning aperture area equal to the area of one scanning aperture is exposed between said opening and photo-electric device, and means operable under the control of the photoelectric device to give a signal or indication when the light falling on the photoelectric device is reduced below a predetermined value.

The scanning member preferably comprises a disc rotatable about an axis parallel with but displaced relatively to the optical axis of the apparatus, the scanning apertures being of generally rectangular contour and spirally disposed in the disc. The opening in the support is of indented contour to conform with the contour of the scanning apertures to pass successive edge portions of the opening. In a preferred construction each scanning aperture has two arcuate sides concentric with the axes of rotation of the disc and their ends radial to the disc.

In one construction according to the invention vessels passing to and from scanning position, are moved through a guide-way disposed above said support, and the means operable under the control of the photo-electric device comprises an arm to project into the path of vessels passing through the said guide-way, an electro-magnet to retain the arm in retracted position, and an amplifier actuated by said photo-electric device to control said electro-magnet. A feeler arm, mounted for actuation by vessels passing through said guide-way, may be provided to actuate a switch adapted to prevent de-energisation of the electro-magnet except when a vessel is disposed over the opening in the support.

In order that the invention may be clearly understood one embodiment thereof will now be described, by way of example, with reference to the accompanying drawings, in which:

Fig. 1 is a section through a machine for scanning the bottoms of milk bottles to detect the presence of foreign bodies thereon, the section being taken on line I—I, Fig. 2;

Fig. 2 is a plan on line II—II, Fig. 1;

Fig. 3 is a front elevation looking in the direction of arrow III, Fig. 1, the machine cover being broken away.

Fig. 4 is a portion of the support for bottles in scanning position, the view being drawn to an enlarged scale to show the contour of the opening in the support;

Fig. 5 is a diagrammatic view showing the manner in which one scanning aperture enters the scanning field as the preceding aperture is leaving the field; and Fig. 6 is a wiring diagram showing the electrical circuits employed in the machine.

Referring to the drawings, the machine illustrated therein is adjusted to accommodate one-pint milk bottles diagrammatically shown in chain line at 10, Fig. 2.

The machine includes a main frame 11 supported on a base member 12 and the frame is enclosed by a cover 13. The machine is arranged to be disposed in juxtaposition with a conveyor 14 moving continuously in the direction of arrow 15, Fig. 2, and adapted to deliver a continuous succession of bottles to the machine and again to receive the bottles after they have been scanned by the machine. During their movement to and from the scanning apparatus the bottles pass through a guide-way formed by guides 16, 17, movement of the bottles through the guide-way being effected by the action of the conveyor 14 continually feeding bottles into the guide-way.

As the bottles leave the conveyor 14 they are moved on to wing portion 18 of a support 19 secured to members 20, Fig. 1, forming part of the main frame. Similarly, as they are moved off the support on to the conveyor they pass over a second wing portion 21.

At a fixed testing position in the path of the bottles, an opening 22 is formed in the support and defines the scanning field. The contour of the opening 22 is described below in greater detail. To enable the machine to test bottles of a size different from that mentioned above, a plurality of supports 19 are provided, each such support having an opening 22 of dimensions and contour appropriate to the size of bottles to be tested. The supports are, therefore, interchangeable and the guides 16, 17 adjustably mounted to permit them to be adjusted to accommodate bottles of different sizes.

Beneath the opening 22 in the support 19 is a photo-electric cell 23, supported by the main frame 11, and a lamp 24 carried by a bracket 25 is arranged to direct its light through the opening 22 towards the cell 23. The cell 23 is housed in a mask 23a, provided with an opening 23b through which the light is directed on to the cell. An optical condenser 26 mounted on frame 11 and optically aligned with the openings 22 and 23b is arranged to concentrate the light that passes through the opening on to the photocell 23.

A scanning member comprising a disc 27 is mounted for rotation in one direction being driven by a motor 28 and rotatable about an axis parallel with but displaced relatively to the optical axis of the apparatus. The disc is so arranged as to be interposed between the opening 22 and the optical condenser 26, Fig. 1. The scanning disc is provided with a spirally arranged series of scanning apertures 29 arranged to scan related portions of the field defined by the opening 22. The scanning disc operates at a speed, of the order of three thousand revolutions per minute, which speed has, in practice, been found to ensure that the bottles are effectively tested as they pass through the testing position without interrupting their movement.

The scanning aperures 29 of the scanning disc are substantially equal in area, the area of each being selected so that light of a predetermined value will pass therethrough to the photocell 23. The successive apertures 29 are spaced apart in the direction of movement of the scanning disc 27 by distances which are related to the arcuate dimensions of the corresponding swept portions of the opening 22 in a manner to ensure that complemental portions of the successive apertures are exposed and obturated by the support 19, as shown in Fig. 5, whereby at any given instant a scanning aperture area equal to the area of one scanning aperture is exposed between the opening 22 and the photocell 23. This is shown clearly in Fig. 2 where one aperture 29 is exposed in the opening 22 and in Fig. 5 where the complemental portions of two successive apertures are exposed thus giving the effect of one completely exposed aperture. The photocell 23 is thus continuously illuminated at a predetermined value except when a shadow falls on the scanning field.

As shown in Figs. 2 and 5 the opening 22 and scanning apertures 29 are so shaped and arranged in relation to one another that the area of each scanning aperture passes out of the scanning field defined by the opening substantially at the same rate as that at which the area of the next scanning aperture enters the scanning field, thus giving the result just described. Conveniently, the scanning disc 27 has arcuate scanning apertures 29 each of which is arranged concentrically with the disc and has straight ends 30 radial to the disc. Since all the apertures have the same area and are positioned at different radial distances from the center of rotation of the scanning disc and, therefore, have different circumferential speeds, their heights (measured in the radial direction in relation to the disc) decrease in accordance with increasing distance from the center of rotation to achieve the desired equality in the rates at which the areas of the several apertures enter and leave the scanning field. It is to be understood that a particular scanning disc will be provided for each support 19, and that, when the support is replaced to accommodate bottles of different sizes, a corresponding change of the scanning disc must be effected.

The edges of the opening 22 are stepped in such a way that each scanning line terminates at each end in a portion 31 of the edge of the opening which extends radially to the axis of rotation of the scanning disc. Each step also has an edge of arcuate form concentric with the axis of rotation of the scanning disc and, as can be seen from Figures 4 and 5, the steps are arranged in pairs, one at each side of the opening 22, considered in the direction of movement of the disc 27 in relation thereto. The edges 31 of adjoining steps are offset from each other so that as a scanning aperture 29 becomes obturated by passing under the edge 31 associated therewith at one end of its scanning path a complementary portion of the next scanning aperture 29 is exposed to the opening 22, as shown in Figure 5, at the opposite side of the opening. The length of each edge portion 31 corresponds to the radial height of the related scanning aperture 29, which height, as previously related, increases in accordance with increasing distance from the center of rotation of the scanning disc.

The opening 22 conforms generally in size and shape to the vessel or to the particular portions thereof that are to be tested. For milk bottles it is necessary to have an opening which includes all or nearly all the clear part of the bottom of the bottle but excludes the peripheral region in which a shadow is cast by the cylindrical walls of the bottle. This requires an opening of generally circular shape and of a diameter somewhat smaller than the external diameter of the bottle but approximating to the inside diameter of the bottom of the bottle. The scanning field is thus generally circular in shape and the scanning lines are of varying length rising to a maximum at a diameter of the scanning field. The scanning apertures 29 in the scanning disc are accordingly unequally spaced in the direction of movement of the disc 27, each scanning aperture being spaced from the one next before it so that it enters the scanning field as the next before it leaves the scanning field as described above. If the scanning apertures 29 corresponding to a complete scanning frame do not extend completely through 360° or one complete rotation of the scanning disc, one or more additional or pilot apertures 29a is or are provided in the disc between the apertures corresponding to the last and first scanning lines of the frame so as to maintain a constant illumination of the photocell through each complete rotation of the disc.

With the arrangement of the apertures shown in Fig. 1, the action is such that the field is scanned alternately towards and away from the axis of rotation of the disc 27.

The photocell 23 is arranged to control a thermionic amplifier 32, Fig. 6, mounted in the housing and adapted to produce an electrical signal when the photocell is darkened by a shadow in the scanning field. The amplifier 32 may be arranged to operate or trigger an alarm device of any required character. As shown in the drawings this device comprises a gravity operated arm 33 arranged to project into the path of the bottles as they pass through the guideway 16, 17 and normally held in a retracted position by an electro-magnet 34 which is controlled by the amplifier 32 and is arranged to be de-energized when a shadow falls on the photocell. When this occurs, the amplifier energizes an electro-magnet 35 which opens a switch 36 and breaks the circuit of the electro-magnet 34 which is normally energized by a battery 37.

A control switch 38 operated by a feeler arm 39 actuated by the bottles as they pass through the guide-way is arranged to prevent de-energization of the electro-magnet 34 except when when one of the bottles is in the test position over the scanning field. Advantageously, the feeler arm 39 is located half a diameter behind the bottle testing position so that as each bottle reaches the testing position the feeler arm enters the V-shaped gap between the wall of the bottle in the testing position and the wall of the bottle immediately behind it. By this arrangement, the action of the feeler arm is less affected by small variations in the shapes of bottles than it would be if it were located exactly opposite the testing position.

Regular variations in the intensity of illumination of the scanning field due to the curvature of the bottom of the milk bottle may be compensated for by inserting a compensating light filter 40 between the optical condenser 26 and the openings 22, the light filter being designed to effect uniform illumination of the photocell 23 throughout the scanning when a clean bottle is in proper position over the opening 22. Further, one of the coupling circuits of the amplifier includes, in known manner, a blocking capacitor, not shown, or the amplifier is otherwise arranged so that it will correspond to a rapid change of illumination of the photocell such as is caused by the passage of a scanning aperture across a shadow in the scanning field but will not be affected by variations in the mean intensity of illumination due to a variation in the general intensity of illumination of the scanning field. The apparatus is thus rendered insensitive to variations in the general illumination of the scanning field due for instance to variations in the colour of the glass of different milk bottles.

In the operation of the testing machine, the bottles move continuously through the machine and each bottle is scanned as it passes through the test position. The control switch 38 operated by the feeler arm 39 prevents the amplifier 32 from de-energizing the magnet 34 that holds the stop arm 33 as the shadows due to the cylindrical walls of the bottle pass across the scanning field; but as each bottle reaches the testing position the control switch 38 is held in position to render the amplifier effective for a sufficient length of time to enable the scanning field to be completely explored. When a bottle containing a foreign body reaches the testing position, therefore, the movement of the scanning aperture across the shadow of the foreign body in the scanning field produces an electrical signal which causes the magnet 34 holding the stop arm 33 to be de-energized. The stop arm 33 then projects into the path of the bottles in front of the test position and stops the movement of the bottles. The faulty bottle therefore remains in the test position until it is removed. The stop arm 33 may be reset by hand or otherwise to allow the delivery and testing of the bottles to be resumed after the faulty bottle has been removed.

In a modified construction the control switch 38 may be operated in known manner by an electronic apparatus controlled by a photo-electric device arranged to be influenced by the movement of the bottles.

It will be appreciated that, if desired, the stop member 33 may be adapted to project automatically into the spaces between the bottles and arranged so that it reaches the position in which it stops the movement of the bottle as each bottle reaches the test position, means controlled by the amplifier being arranged to retract the stop member automatically when the light sensitive device is continuously illuminated. By this arrangement the arrival of each clean bottle at the test position causes the amplifier to produce a signal which releases the stop member automatically and allows the movement of the bottles to continue; but when a bottle containing a foreign body arrives at the test position, the signal given by the amplifier is ineffective for retracting the stop member, and the movement of the bottles is therefore arrested.

We claim:

1. In apparatus for detecting the presence of foreign bodies on the bottoms of transparent vessels and having a source of light supported to direct light through the bottom of a vessel, a photo-electric device activated by light of a predetermined value falling thereon from said light source, and means operable under the control of the photo-electric device to give a signal or indication when light falling thereon is reduced below said predetermined value; the combination therewith of an opaque vessel support having a transparent opening the area of which is substantially equal to the internal area of the bottom of a vessel, and a scanning member movable between said vessel support and the photo-electric device and having scanning apertures of substantially equal area arranged to scan different parallel portions of said opening in the vessel support, the trailing edges of successive apertures being spaced from each other in the direction of movement of the scanning member by a distance substantially equal to the distance between the ends of the related portions of said opening at which the preceding and succeeding apertures respectively move out of and into registration with said related portions and measured in the direction parallel to said portions for complementary exposure and obturation by said vessel support so that at all times an area of the transparent opening equal to that of one scanning aperture is exposed to permit the passage of light from the light source to the photo-electric device.

2. In apparatus for detecting the presence of foreign bodies on the bottoms of transparent vessels, the combination according to claim 1, wherein said scanning member comprises a disc rotatable about an axis parallel with but displaced relatively to the optical axis of the apparatus, the scanning apertures being spirally disposed in the disc and each having the configuration of a sector of a ring.

3. In apparatus for detecting the presence of foreign bodies on the bottoms of transparent vessels, the combination according to claim 2, wherein for vessels having circular bottoms said opening in the vessel support is of generally circular form with, considered in the direction of movement of the disc in relation thereto, pairs of steps formed one in each of the opposite sides of the opening, each step having two edges one of which is concentric with the axis of rotation of said disc to overlie the path traversed by the outer side of a related scanning aperture and the other edge of each step defining one end of the path traversed by the related scanning aperture across said opening, the path defining edges of a pair of steps being complementary and those for co-operation with successive scanning apertures being offset to expose and obturate complementary portions of the successive scanning apertures moving respectively into and out of scanning relation with the opening in the vessel support.

4. In apparatus for detecting the presence of foreign bodies on the bottoms of transparent vessels, the combination according to claim 3, including a guideway above said support and through which vessels are moved in succession over the support, an arm projectable into the guideway for engagement by vessels passing therethrough, an electro-magnet to retain said arm in normally retracted position out of the guideway, and an amplifier operatively associated with said photo-electric device for actuation by the latter to control the electro-magnet.

5. In apparatus for detecting the presence of foreign bodies on the bottoms of transparent vessels, the combination according to claim 4, including a feeler arm mounted for actuation by vessels passing through said guideway, and a switch actuated by the feeler to prevent de-energization of the electromagnet except when a vessel is disposed over the opening in said vessel support.

6. In apparatus for detecting the presence of foreign bodies on the bottoms of transparent vessels, the combination according to claim 1, including a guideway positioned above said support and through which vessels are moved in succession over the support, an arm projectable into the guideway for engagement by vessels passing therethrough, an electro-magnet operative to retain said arm in normally retracted position out of the guideway, and an amplifier operatively associated with the photo-electric device for actuation by the latter to control the electro-magnet.

7. In apparatus for detecting the presence of foreign bodies on the bottoms of transparent vessels, the combination according to claim 6, including a feeler arm mounted for actuation by vessels passing through said guideway, and a switch actuated by the feeler to prevent de-energization of the electromagnet except when a vessel is disposed over the opening in said vessel support.

8. In apparatus for detecting the presence of foreign bodies on the bottoms of transparent vessels, the combination according to claim 1, wherein said scanning member comprises a disc rotatable about an axis parallel with but displaced relative to the optical axis of the apparatus, said scanning apertures being spirally disposed in the disc and formed with contours which are sectors of rings having dimensions radially of the disc which decrease in accordance with increasing distances of the apertures from said axis of rotation of the disc so that the areas of said apertures sweep the corresponding portions of said opening in the support at the same rate.

NORMAN PARKER STOATE.
GEOFFREY ERNEST SHEPHEARD.

References Cited in the file of this patent

UNITED STATES PATENTS

| Number | Name | Date |
|---|---|---|
| 1,023,925 | Court | Apr. 23, 1912 |
| 1,337,737 | Vander Bijl | Apr. 20, 1920 |
| 1,475,583 | Hoxie | Nov. 27, 1923 |
| 1,748,883 | Kell | Feb. 25, 1930 |
| 1,877,547 | Armstrong | Sept. 13, 1932 |
| 1,943,278 | Thompson | Jan. 9, 1934 |
| 2,010,307 | Leishman | Aug. 6, 1935 |
| 2,056,382 | Ayres | Oct. 6, 1936 |
| 2,100,227 | Stoate | Nov. 23, 1937 |
| 2,104,546 | Pennell | Jan. 4, 1938 |
| 2,132,447 | Stout | Oct. 11, 1938 |
| 2,137,187 | Stoate | Nov. 12, 1938 |
| 2,227,037 | Schlesinger | Dec. 31, 1940 |
| 2,265,037 | Gulliksen | Dec. 2, 1941 |
| 2,376,645 | Wolff | May 22, 1945 |
| 2,431,519 | Stoate | Nov. 25, 1947 |
| 2,439,392 | Jones | Apr. 13, 1948 |
| 2,481,310 | Hutchinson | Sept. 6, 1949 |

FOREIGN PATENTS

| Number | Country | Date |
|---|---|---|
| 472,143 | Great Britain | Sept. 17, 1937 |

OTHER REFERENCES

"Electronics," by technical staff, Coyne Electrical School, published by Coyne Electrical School, Chicago, 1945, pages 344 and 345.

Maintenance Manual of Electronic Control, R. E. Miller, published by McGraw-Hill Book Co., New York and London, 1949, pages 81 and 82.